UNITED STATES PATENT OFFICE.

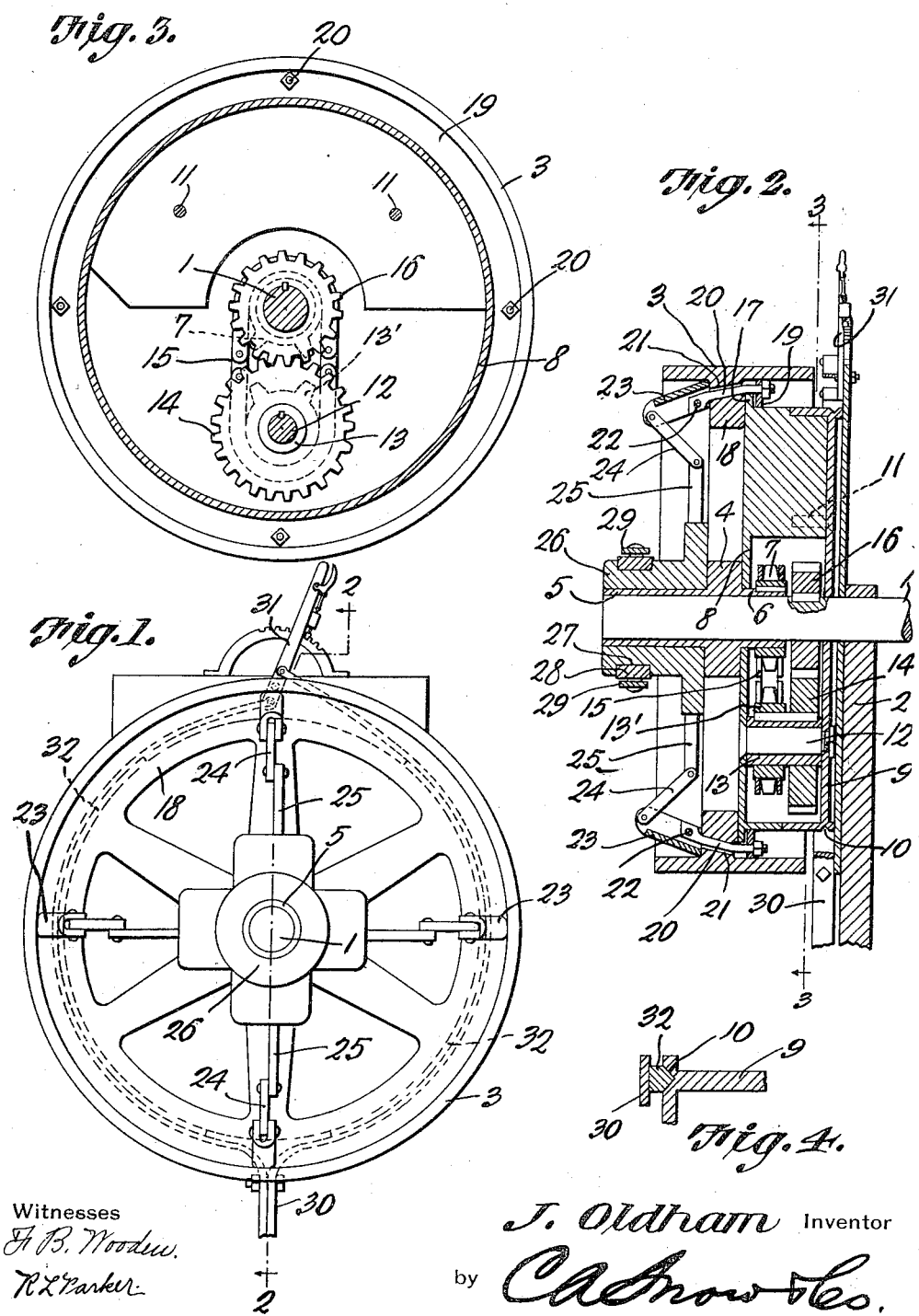

JOHN OLDHAM, OF HELM, KENTUCKY.

TRANSMISSION MECHANISM.

1,210,829.  Specification of Letters Patent.  Patented Jan. 2, 1917.

Application filed August 2, 1916. Serial No. 112,761.

*To all whom it may concern:*

Be it known that I, JOHN OLDHAM, a citizen of the United States, residing at Helm, in the county of Russell and State of Kentucky, have invented a new and useful Transmission Mechanism, of which the following is a specification.

This invention relates to transmission mechanism particularly designed for use in connection with hydro-carbon engines.

Heretofore where hydro-carbon engines have been used it has always been necessary to utilize a transmission whereby the driven shaft can be rotated forwardly, brought to a stop, or reversed. The mechanism employed for this purpose, however, has been undesirable under some conditions because of its bulky construction. For example, where stationary engines have been used in cramped positions, as in connection with some types of agricultural machinery, on motor boats and the like, the ordinary forms of transmission mechanisms have been undesirable because of their size and weight.

One of the objects of the present invention is to provide a transmission which is light, compact and durable and which, when used in connection with a driven pulley, will be housed therein.

A further object is to provide mechanism of this character which can be quickly and readily controlled so as to cause the driven element to rotate in either of two directions or to remain stationary independently of the rotation of the drive shaft of the motor.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a front elevation of the transmission mechanism. Fig. 2 is a section on line 2—2 Fig. 1. Fig. 3 is a section on line 3—3 Fig. 2, the cap of the transmission being removed. Fig. 4 is a transverse section through a portion of the cap of the transmission and showing one of the gripping shoes in section and engaging the same.

Referring to the figures by characters of reference 1 designates the drive shaft of a hydro-carbon engine or the like, the same being mounted within a suitable supporting structure 2. Mounted for rotation on this shaft is a driven element which, in the present instance, is in the form of a pulley 3 the hub 4 of which has tubular extensions 5 and 6 extending in opposite directions therefrom and engaging the shaft 1. A sprocket 7 is keyed or otherwise secured to the extension 6 and mounted for rotation on said extension between the sprocket and the hub 4 is a cylindrical drum or casing 8. That face of the casing remote from the hub 4 is adapted to be closed by a circular cap 9 having a peripheral groove 10 preferably V-shaped in cross section. This cap is adapted to be secured to the casing 8 in any manner desired, as by means of screws 11. A shaft 12 is carried by the casing 8 and is parallel with shaft 1, there being a sleeve 13 mounted for rotation on the shaft 12. Secured to this sleeve so as to rotate therewith, is a sprocket 13′ and a gear 14. A chain 15 engages the sprockets 7 and 13′ so as to transmit motion from one to the other, while gear 14 constantly meshes with a smaller gear 16 keyed or otherwise secured to the shaft 1.

The casing 8 has an annular flange 17 extending close to the web 18 of pulley 3 and extending around casing 8 is a clamping ring 19 normally supported close to but out of contact with the flange 17. Secured to the ring 19 are bolts 20 which extend through openings 21 in the web 18 of the pulley and are pivotally connected, as at 22, to cams 23 bearing against the outer face of the web 18. These cams are connected by links 24 to arms 25 extending radially from a sleeve 26 which is mounted to slide upon the tubular extension 5. This sleeve 26 can be shifted by any suitable means provided for that purpose. For example the sleeve may be formed with an annular groove 27 in which a ring 28 is loosely seated, this ring being engaged by a forked shifting lever portions of which have been indicated at 29.

Secured to the structure 2 at points adjacent the cap 9 are flexible straps 30 which extend in opposite directions about the cap and are secured at their ends to an actuating lever 31. These straps are provided with arcuate shoes 32 each of which is preferably V-shaped in cross section. These shoes are so positioned that when lever 31 is shifted in one direction the straps will draw the shoes toward each other and cause them to bind against the walls of the groove 10, thus to hold the cap and the parts connected thereto against rotation. When lever 31 is shifted in the opposite direction, the shoes will be disengaged from the cap 9 and said cap permitted to rotate freely.

When the shoes 32 are disengaged from the cap 9 and the ring 19 is disengaged from the flange 17, it will be apparent that the shaft 1 when rotated will merely cause the gear 16 to rotate gear 14 with the result that the sprocket 13' will travel along the chain 15 and thus move in a circle about the sprocket 7. Thus the casing 8 will revolve on the shaft 1 and tubular extension 6, while the element 3 will remain stationary. Should it be desired to couple said element 3 to the casing 8 so as to cause the two to rotate together, it would merely be necessary to shift the sleeve 26 so as to cause the arms 25 to thrust through links 24 upon the cams 23. The cams 23 will operate to pull the bolts 20 and cause the ring 19 to bind against the flange 17. Thus the casing 8 and the element 3 will be coupled together and will rotate together. When it is desired to reverse the rotation of the element 3 the brake shoes 32 are thrust into engagement with the walls of the groove 10 so as thus to hold the casing 8 against rotation. Consequently the rotation of shaft 1 will result in the transmission of rotary motion from gear 16 to gear 14 and thence from sprocket 13' to sprocket 7. Consequently the driven element 3 will be rotated in a direction the reverse of the direction of rotation of shaft 1. It is of course to be understood that when reverse movement of the element 3 is desired, it is necessary to release the ring 19 from engagement with the flange 17.

Importance is attached to the fact that the transmission mechanism is practically entirely housed within the driven pulley 3 so that it will not occupy any undesirable space, but can, in fact, be placed in any position capable of accommodating the pulley. Thus the mechanism is especially useful in connection with motor boats and on some forms of agricultural machinery. It is to be understood of course that means other than those described may be used for actuating the ring 19 and for shifting the gripping shoes 32.

What is claimed is:

1. The combination with a drive shaft and a driven element mounted for rotation on the shaft, of a casing mounted for rotation within the driven element and upon the shaft, means for coupling the casing to and uncoupling it from the driven element, means for engaging the casing to hold it against rotation, a gear secured to the shaft and within the casing, a sprocket within the casing and revoluble with the driven element, a driven gear mounted within and revoluble with the casing and meshing with the gear upon the shaft, a sprocket revoluble with the driven gear, and a chain connecting the sprockets.

2. The combination with a drive shaft and a pulley mounted for rotation on the shaft, of a casing seated within and revoluble relative to the pulley, said casing being revoluble upon the shaft, coöperating means upon the pulley and casing for holding said pulley and casing against independent rotation, means for engaging the casing to hold it against rotation with the pulley, and mechanism within the casing for transmitting motion from the shaft to the pulley.

3. The combination with a drive shaft and a pulley mounted for rotation on the shaft, of a casing seated within and revoluble relative to the pulley, said casing being revoluble upon the shaft, coöperating means upon the pulley and casing for holding said pulley and casing against independent rotation, means for engaging the casing to hold it against rotation with the pulley, and mechanism within the casing for transmitting motion from the shaft to the pulley, said mechanism including a gear secured to the shaft, a sprocket revoluble with the pulley, a gear mounted for rotation within the casing and revoluble with the casing, said gear meshing with the gear upon the shaft, a sprocket revoluble with the second mentioned gear, and a chain engaging the sprocket.

In testimony that I claim the foregoing as my own, I have hereto affixed my signature in the presence of two witnesses.

JOHN OLDHAM.

Witnesses:
 HERBERT D. LAWSON,
 R. W. HOAGLAND.

Copies of this patent may be obtained for five cents each, by addressing the "Commissioner of Patents, Washington, D. C."